United States Patent
Hughes et al.

(10) Patent No.: US 10,340,571 B2
(45) Date of Patent: Jul. 2, 2019

(54) ROPE CONDUCTOR FOR GUIDED WAVE RADAR COAXIAL WAVEGUIDE

(71) Applicant: Honeywell International Inc., Morris Plains, NJ (US)

(72) Inventors: Michael Kon Yew Hughes, Vancouver (CA); Stuart James Heath, Surrey (CA)

(73) Assignee: Honeywell International Inc., Morris Plains, NJ (US)

( * ) Notice: Subject to any disclaimer, the term of this patent is extended or adjusted under 35 U.S.C. 154(b) by 29 days.

(21) Appl. No.: 15/438,936

(22) Filed: Feb. 22, 2017

(65) Prior Publication Data

US 2018/0241111 A1 Aug. 23, 2018

(51) Int. Cl.
*H01P 3/06* (2006.01)
*G01S 13/88* (2006.01)
*G01S 7/03* (2006.01)
*H01Q 1/12* (2006.01)
*G01F 23/284* (2006.01)
*G01S 13/02* (2006.01)

(52) U.S. Cl.
CPC ............. *H01P 3/06* (2013.01); *G01S 7/03* (2013.01); *G01S 13/88* (2013.01); *H01Q 1/1235* (2013.01); *G01F 23/284* (2013.01); *G01S 13/0209* (2013.01)

(58) Field of Classification Search
CPC ............. H01P 3/06; H01P 1/30; G01F 23/284
See application file for complete search history.

(56) References Cited

U.S. PATENT DOCUMENTS

| | | | |
|---|---|---|---|
| 4,171,609 A | 10/1979 | Feese | |
| 4,976,509 A | 12/1990 | Bachmann et al. | |
| 6,229,476 B1 | 5/2001 | Lutke et al. | |
| 7,159,458 B2 | 1/2007 | Reimelt et al. | |
| 7,255,002 B2 * | 8/2007 | Gravel | G01F 23/284 |
| | | | 73/290 R |
| 7,345,623 B2 | 3/2008 | McEwan | |
| 7,441,454 B2 | 10/2008 | Reimelt et al. | |
| 8,222,977 B2 | 7/2012 | Oyama et al. | |
| 9,074,922 B2 * | 7/2015 | Dayal | G01F 23/284 |
| 9,711,838 B2 * | 7/2017 | Heath | H01P 5/08 |
| 2006/0225499 A1 | 10/2006 | Gravel et al. | |
| 2008/0078244 A1 * | 4/2008 | Dietmeier | G01F 23/268 |
| | | | 73/304 C |

(Continued)

OTHER PUBLICATIONS

A Goubau Line for Bench Testing of Beam Instrumentation, Bergoz Instrumentation, DITANET—Conference, Nov. 9-11, 2011, 15 pages.

(Continued)

*Primary Examiner* — Dean O Takaoka
*Assistant Examiner* — Alan Wong

(57) ABSTRACT

A coaxial guided wave radar apparatus includes a central conductor configured as a wire rope. One or more spacers can be positioned and held in place about the central conductor at predetermined lengths along the central conductor, wherein each spacer is positioned and held in place along the central conductor by one or more respective retainers that are crimped to the central conductor. A tensioner can be attached to the end of the wire rope of the central conductor. The tensioner allows for a proper tension to be applied to maintain a spacing of the wire rope from an outer conductor.

19 Claims, 2 Drawing Sheets

(56) References Cited

U.S. PATENT DOCUMENTS

| | | | |
|---|---|---|---|
| 2009/0121917 A1 | 5/2009 | Delin et al. | |
| 2013/0314275 A1 | 11/2013 | Fredriksson et al. | |
| 2014/0084944 A1* | 3/2014 | Kienzle | G01F 23/284 |
| | | | 324/642 |
| 2014/0111371 A1 | 4/2014 | Edvardsson | |
| 2014/0125512 A1 | 5/2014 | Janitch | |
| 2015/0177044 A1 | 6/2015 | Edvardsson | |
| 2016/0003662 A1* | 1/2016 | Dayal | G01F 23/284 |
| | | | 73/304 R |
| 2016/0069729 A1 | 3/2016 | Wardas et al. | |
| 2016/0153820 A1 | 6/2016 | Heath | |
| 2016/0153821 A1 | 6/2016 | Nilsson et al. | |
| 2016/0238702 A1 | 8/2016 | Muldowney | |
| 2016/0266240 A1 | 9/2016 | Hughes et al. | |
| 2016/0320223 A1 | 11/2016 | Heath et al. | |
| 2016/0320224 A1 | 11/2016 | Eriksson | |
| 2016/0334262 A1* | 11/2016 | Haran | G01F 23/284 |
| 2017/0047632 A1 | 2/2017 | Lee et al. | |
| 2017/0048969 A1 | 2/2017 | Qiang et al. | |
| 2017/0356783 A1* | 12/2017 | Dietmeier | G01F 23/0046 |

OTHER PUBLICATIONS

Goubau line—Wikipedia, printed Oct. 14, 2016, 3 pages.
Elmore, G., et al., A Surface Wave Transmission Line, QEX May/Jun. 2012, 7 pages.
Stulle, F. et al., The Goubau Line—Surface Waves for Bench Testing of Beam Instrumentation at High Frequencies, Proceedings of BIW 2012, Newport News, VA, 3 pages.
Waveguide (electromagnetism)—Wikipedia, printed Oct. 14, 2016, 10 pages.
Honeywell Zipline Scanning Measurement Device, Honeywell, Feb. 2015, 2 pages.
PCT Notification of Transmittal of the International Search Report and the Written Opinion of the International Searching Authority, or the Declaration (PCT Rule 44.1); PCT/US2018/018582, dated Jun. 7, 2018.
PCT Written Opinion of the International Searching Authority (PCT Rule 43bis.l); PCT/US2018/01858, dated Jun. 7, 2018.
Patent Cooperation Treaty International Search Report, US2018/01858, dated Jun. 7, 2018.

* cited by examiner

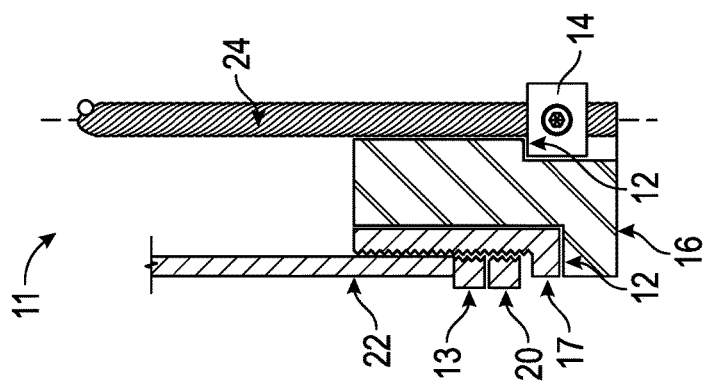
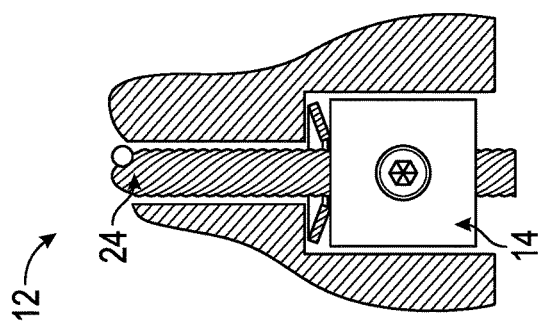
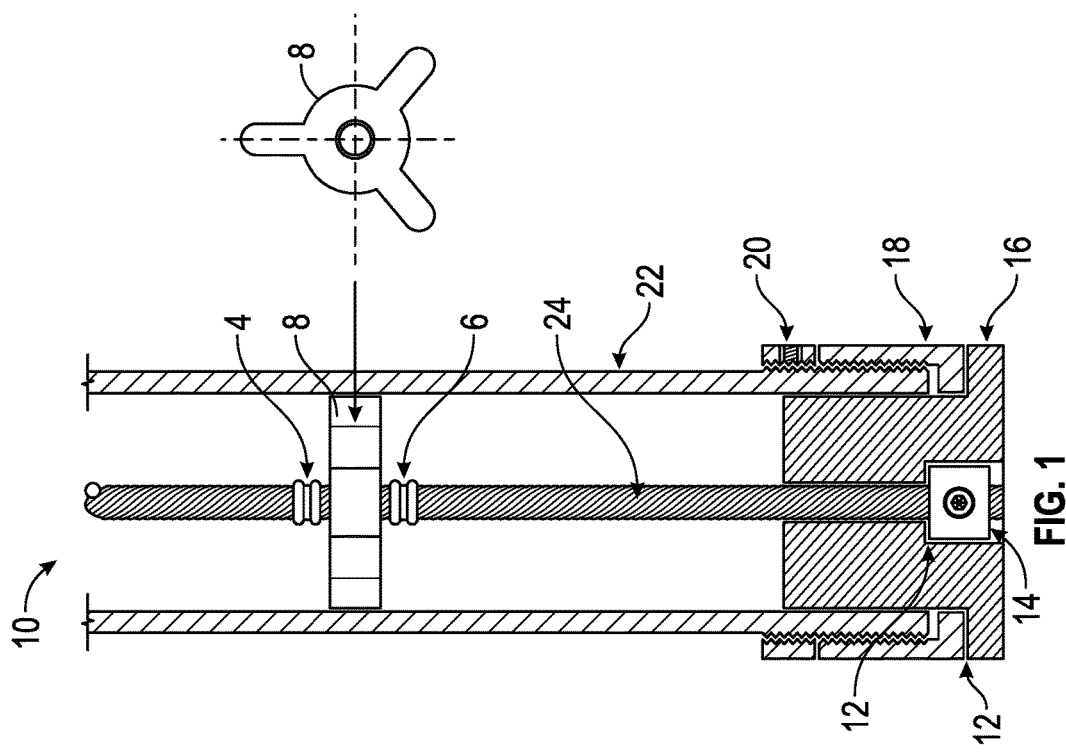

ROPE CONDUCTOR FOR GUIDED WAVE RADAR COAXIAL WAVEGUIDE

TECHNICAL FIELD

Embodiments are related to waveguides of guided wave radar level transmitters. Embodiments also relate to conductors and in particular, rope conductors, utilized with guided wave radar coaxial waveguides. Embodiments are also related to guided wave radar devices and systems.

BACKGROUND

Processing facilities and other facilities routinely include tanks for storing liquid and other materials. For example, storage tanks are routinely used in tank farms and other storage facilities to store oil or other materials. As another example, oil tankers and other transport vessels routinely include numerous tanks storing oil or other materials. Processing facilities also include tanks for implementing an industrial process, such as receiving material through an input of the tank while allowing material to leave through an output of the tank (e.g., in oil refining operations or chemical production).

Often times it is necessary or desirable to measure the amount of material stored in a tank, for example, in order to control the level of material in the tank to be at a desired level during an industrial process of receiving or releasing material in the tank. Radar gauges can be used to measure an amount of material stored in a tank. Radar gauges transmit signals towards a material in a tank and receive signals reflected off the material in the tank.

Microwave level gauge or radar level gauge systems are in wide use for determining the fill level of a product contained in a tank. Radar level gauging is generally performed either by means of non-contact measurement, whereby electromagnetic signals are transmitted using a "free space" mode without a guide towards the product contained in the tank or by means of contact measurement, often referred to as guided wave radar (GWR), whereby electromagnetic signals are guided towards and into the product by a probe acting as a guided wave transmission line.

Such a probe is generally arranged to extend vertically from the top towards the bottom of the tank. The probe may also be arranged in a measurement tube, a so-called chamber, which is connected to the outer wall of the tank and is in fluid connection with the inside of the tank. Typically, the probe extends from a transmitter/receiver assembly into the product inside the tank, or chamber, via a sealing arrangement which may form a hermetic barrier. The most common type of guided wave radar uses short pulses (around 1 ns) without carrier and occupies a frequency range of roughly 0.1-1 GHz.

GWR is commonly used in the process industry to measure the product level in such tanks. GWR uses time domain reflectometry to measure the distance to the product. In GWR measurement systems, a waveguide is used to direct a short (e.g., ~1 ns) EM pulse towards the surface of the medium in the tank. For deep tanks (e.g., >6 m), stainless steel wire rope can be employed as a waveguide.

GWR devices may be configured in the context of different and multiple probe types. For example, one of these types involves the use of a coaxial probe which had a rod central conductor and a tube outer conductor. However, the high temperature and pressure version of this type probe utilizes brittle ceramic spacers, which are easy to break while assembling the probe in the field as must be done due to long total lengths. Furthermore, such a probe is quite complicated to assemble, is quite expensive, and its length cannot be trimmed in the field. Solutions are thus needed to overcome these problems.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved waveguide apparatus.

It is another aspect of the disclosed embodiments to provide for an improved rope conductor construction for a guided wave radar level transmitter.

It is also an aspect of the disclosed embodiments to provide for an improved coaxial guided wave radar apparatus.

It is a further aspect of the disclosed embodiments to provide for a coaxial guided wave radar apparatus that includes a wire rope conductor component and a tensioner.

The aforementioned aspects and other objectives and advantages can now be achieved as described herein. A coaxial guided wave radar apparatus includes a central conductor configured as a wire rope. One or more spacers can be positioned and held in place about the central conductor at predetermined lengths along the central conductor, wherein each spacer is positioned and held in place along the central conductor by one or more respective retainers that are crimped to the central conductor. A tensioner can be attached to the end of the wire rope of the central conductor. The tensioner allows for a proper tension to be applied to maintain a spacing of the wire rope from an outer conductor.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates a side cut-away view of a coaxial guided wave radar apparatus, in accordance with an example embodiment;

FIG. 2 illustrates a side cut-away view of a preload device, which can be adapted for use with the coaxial guided wave radar apparatus depicted in FIG. 1, in accordance with an example embodiment;

FIG. 3 illustrates a side cut-away view of an alternate tensioner that can be adapted for use with the coaxial guided wave radar apparatus depicted in FIG. 1, in accordance with an example embodiment.

DETAILED DESCRIPTION

Figure 4:
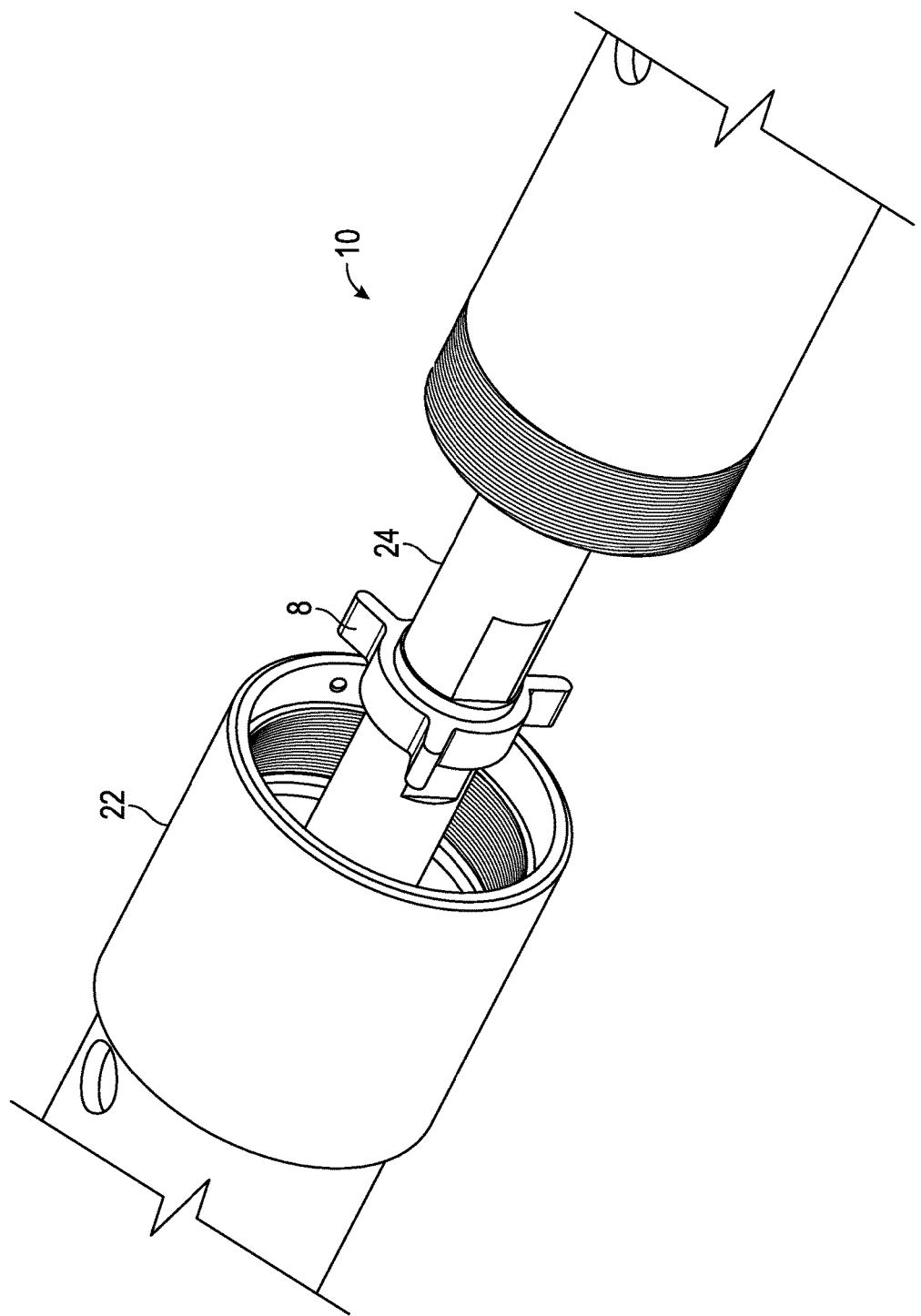
FIG. 4 illustrates a side perspective view of a coaxial waveguide implementation in which the central conductor is configured from a rigid rod.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout. As used herein, the term "and/or" includes any and all combinations of one or more of the associated listed items.

Subject matter may be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is not, therefore, intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. The term "at least one" can also refer "one or more".

FIG. 1 illustrates a side cut-away view of a coaxial guided wave radar apparatus 10, in accordance with an example embodiment. The coaxial guided wave radar apparatus 10 includes a central conductor 24 (e.g., a wire rope) which can be swaged and cut to length (e.g., in a factory). The central conductor 24 is preferably configured from the same material utilized to configure the aforementioned wire roped (e.g., a rope probe). At predetermined lengths, one or more spacers such as a ceramic spacer 8 can be positioned and held in place by one or more small retainers 4, 6, which are crimped to the conductor 24. The retainer 4 is shown in FIG. 1 immediately above the ceramic spacer 8 and the retainer 6 is shown in FIG. 1 just below the ceramic spacer 8.

An additional tensioning piece or tensioner 18 can be provided to maintain proper spacing of the central rope to the outer tube wall, as shown in FIG. 1. A rope stop 14 is provided at the end of conductor 24 to provide a reaction force, through an electrically insulating load ring 16, to the tensioner. This stop can be crimped or held by a set screw. The material for the load ring 16 is preferably configured from a similar material to the spacer 8, and can be generally selected for its strength and chemical compatibility. A screw mechanism on the outer conductor 22 and tensioner 18 is used to adjust tension on the conductor 24 (i.e., wire rope). A locking collar 20 is used to lock in the preload.

An additional pre-loading mechanism or preload device 12 (e.g., a spring or Belleville washer(s)) can be provided, which takes up any thermo-mechanical breathing caused by different materials' thermal expansion coefficients. An insulating load ring 16 (e.g., a ceramic load ring) surrounds the wire rope stop 14 and the bottom portion of the conductor 24.

FIG. 2 illustrates a side cut-away view of the preload device 12, which can be adapted for use with the coaxial guided wave radar apparatus 10 depicted in FIG. 1, in accordance with an example embodiment. As shown in greater detail in FIG. 2, the wire rope stop 14 surrounds the bottom portion or end of the conductor 24.

FIG. 3 illustrates a side cut-away view of an alternate tensioner 17 that can be adapted for use with the coaxial guided wave radar apparatus 10 depicted in FIG. 1, in accordance with an example embodiment. The tensioner 17 depicted in FIG. 3 can be implemented in place of the tensioner 18 shown in FIG. 1. The configuration depicted in FIG. 3 includes the conductor 24, the wire rope stop 14, the coaxial probe tube 22, along with the lock nut 20 that are shown in FIG. 1. An additional drive nut 13 is shown the configuration in FIG. 3.

FIG. 4 illustrates a side perspective view of a traditional coaxial probe construction using a rigid central conductor. FIG. 4 is a depiction of a typical coaxial probe implementation. Typically, a coaxial probe utilizes a rigid inner rod surrounded by an outer tube. The two are kept in place with respect to each other by spacers positioned along the length of the rod. The spacers are retained by notches machined in the rod or tube. FIG. 4 is therefore provided herein to illustrate the current state. The present inventors wish to replace the rigid rod with a flexible rope to make assembly of the overall assembly easier.

The main advantage of the flexible inner rope is that it can be trimmed in the field. FIG. 3 illustrates an embodiment that lends itself to easy field trimming. Neither the outer tube nor the inner rope have any special machined features on their ends. This allows the user to cut off what they want and place back the wire stop and tensioner.

The coaxial construction disclosed herein is unique and offers a number of advantages. For example, the coaxial guided wave radar apparatus 10 can be implemented in the context of a probe, wherein the cost of such a probe can be reduced both in terms of raw material and in machining. The field assembly for implementing such a probe can be simplified because the spacers such as spacer 8 will already be in place on the central conductor 24. The increased flexibility of the wire or conductor 24 in comparison to the rod currently used should mean that the ceramic spacers such as spacer 8 are less likely to be broken during assembly. These features will result in cost improvements and the resulting transmitter is likely to be perceived in the market as being easier to assemble. Another advantage of some implementations of this construction is that the probe length can be adjusted in the field.

Based on the foregoing, it can be appreciate that a number of different example embodiments are disclosed herein. For example, in one embodiment, a coaxial guided wave radar apparatus can be configured, which includes a central conductor comprising a wire rope; a plurality of spacers positioned and held in place about the central conductor at predetermined lengths along the central conductor, wherein each space among the plurality of spacers is positioned and held in place along the central conductor by at least one retainer that is crimped to the central conductor; and a tensioner attached to an end of the wire rope of the central conductor, wherein the tensioner allows for a proper tension to be applied to maintain a spacing of the wire rope from an outer conductor.

In another example embodiment, the central conductor can be configured from the same material as the wire rope. In yet another example embodiment, the aforementioned tensioner can be crimped to allow the tensioner to be attached to the end of the wire rope. In still another example embodiment, the tensioner can be attached to the end of the wire rope by a set screw.

In another example embodiment, the tensioner can be configured from a material similar to a material utilized to configure the plurality of spacers. In still another example embodiment, a screw mechanism can adjust the tension of the wire rope. In yet another example embodiment, a preloading mechanism can be provided, which handles thermomechanical breathing resulting from varying thermal expansion coefficients associated with different materials of the coaxial guided wave radar apparatus. In still another example embodiment, the wire ropes can comprise a flexible inner rope that is trimmable in the field.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The invention claimed is:

1. A coaxial guided wave radar apparatus, comprising:
a central conductor comprising a bottom portion, a wire rope and a wire rope stop associated with the wire rope;
a plurality of spacers positioned and held in place about said central conductor at predetermined lengths along said central conductor, wherein each space among said plurality of spacers is positioned and held in place along said central conductor by at least one retainer that is crimped to said central conductor;
a tensioner attached to an end of said wire rope of said central conductor, wherein said tensioner allows for a proper tension to be applied to maintain a spacing of said wire rope from an outer conductor;
a pre-loading mechanism arranged to handle thermo-mechanical breathing resulting from varying thermal expansion coefficients associated with the different materials of said coaxial guided wave radar apparatus; and
an insulating load ring surrounding the wire rope stop and the bottom portion of the central conductor, wherein the wire rope stop provides a reaction force through the insulating load ring to the tensioner.

2. The apparatus of claim 1 wherein said insulating load ring comprises a ceramic material.

3. The apparatus of claim 1 further a comprising a locking collar that is used to lock in a preload and wherein said tensioner is crimped to allow said tensioner to be attached to said end of said wire rope.

4. The apparatus of claim 1 wherein said tensioner is attached to said end of said wire rope by a set screw.

5. The apparatus of claim 1 wherein said tensioner is configured from a material similar to a material utilized to configure said plurality of spacers.

6. The apparatus of claim 1 further comprising a screw mechanism for adjusting a tension of said wire rope.

7. The apparatus of claim 1 wherein said wire rope comprises a flexible inner rope that is trimmable in the field.

8. A coaxial guided wave radar apparatus, comprising:
a central conductor comprising a bottom portion, a wire rope that includes a flexible inner rope, and a wire rope stop associated with the wire rope;
a plurality of spacers positioned and held in place about said central conductor at predetermined lengths along said central conductor, wherein each space among said plurality of spacers is positioned and held in place along said central conductor by at least one retainer that is crimped to said central conductor;
a tensioner attached to an end of said wire rope of said central conductor, wherein said tensioner allows for a proper tension to be applied to maintain a spacing of said wire rope from an outer conductor;
a pre-loading mechanism arranged to handle thermo-mechanical breathing resulting from varying thermal expansion coefficients associated with the different materials of said coaxial guided wave radar apparatus; and
an insulating load ring surrounding the wire rope stop and the bottom portion of the central conductor, wherein the wire rope stop provides a reaction force through the insulating load ring to the tensioner.

9. The apparatus of claim 8 wherein said insulating load ring comprises a ceramic material and said central conductor is configured from the same material as said wire rope.

10. The apparatus of claim 8 further a comprising a locking collar that is used to lock in a preload and wherein said tensioner is crimped to allow said tensioner to be attached to said end of said wire rope.

11. The apparatus of claim 8 wherein said tensioner is attached to said end of said wire rope by a set screw.

12. The apparatus of claim 8 wherein said tensioner is configured from a material similar to a material utilized to configure said plurality of spacers.

13. The apparatus of claim 8 further comprising a screw mechanism for adjusting a tension of said wire rope.

14. A method of configuring a coaxial guided wave radar apparatus, said method comprising:
configuring a coaxial guided wave radar apparatus to include a central conductor with a wire rope associated with a wire rope stop, the central conductor having a bottom portion;
positioning a plurality of spacers about said central conductor at predetermined lengths along said central conductor, wherein each space among said plurality of spacers is positioned and held in place along said central conductor by at least one retainer that is crimped to said central conductor;
attaching a tensioner to an end of said wire rope of said central conductor, wherein said tensioner allows for a proper tension to be applied to maintain a spacing of said wire rope from an outer conductor;

arranging a pre-loading mechanism in the coaxial guided wave radar apparatus to handle thermo-mechanical breathing resulting from varying thermal expansion coefficients associated with the different materials of said coaxial guided wave radar apparatus; and surrounding the wire rope stop and bottom portion of the central conductor with an insulating load ring, wherein the wire rope stop provides a reaction force through the insulating load ring to the tensioner.

15. The method of claim 14 further comprising:

configuring said insulating load ring from a ceramic material; and configuring said central conductor from the same material as said wire rope.

16. The method of claim 14 further comprising:

locking in a preload in the coaxial guided wave radar apparatus with a locking collar;

crimping said tensioner to allow said tensioner to be attached to said end of said wire rope; and attaching said tensioner to said end of said wire rope by a set screw.

17. The method of claim 14 further comprising configuring said tensioner from a material similar to a material utilized to configure said plurality of spacers.

18. The method of claim 14 further comprising adjusting a tension of said wire rope with a screw mechanism.

19. The method of claim 14 further comprising locking in a preload in the coaxial guided wave radar apparatus with a locking collar.

* * * * *